United States Patent

[11] 3,538,926

| [72] | Inventor | George G. Nesbitt<br>Denver, Colorado |
|---|---|---|
| [21] | Appl. No. | 686,095 |
| [22] | Filed | Nov. 28, 1967 |
| [45] | Patented | Nov. 10, 1970 |
| [73] | Assignee | Denver Wood Products Co.,<br>a corporation of Colorado |

[54] WASHER-DRYER FOR AUTOMOTIVE TYPE AIR FILTERS
4 Claims, 9 Drawing Figs.

[52] U.S. Cl. ............................................. 134/102,
134/141, 134/149, 134/170; 15/304
[51] Int. Cl. ........................................................... B08b 3/02,
B08b 5/02, B08b 9/00
[50] Field of Search............................................. 134/23, 33,
51, 102, 138, 139, 140, 141, 149, 167, 170;
15/302, 307, 310, 304, 306

[56] References Cited

UNITED STATES PATENTS

| 2,178,701 | 11/1939 | Petre | 134/33 |
| 2,201,685 | 5/1940 | Lorenzen | 134/139X |
| 2,242,901 | 5/1941 | Birch | 15/306 |
| 2,699,793 | 1/1955 | Buck et al. | 134/33UX |
| 2,756,455 | 7/1956 | Slaughter | 15/306 |
| 2,774,362 | 12/1956 | Nordling | 134/138X |
| 3,021,972 | 2/1962 | Everroad | 15/307X |

FOREIGN PATENTS

| 525,249 | 8/1940 | Great Britain | 134/141 |

*Primary Examiner*—Daniel Blum
*Attorney*—C.B. Messenger

ABSTRACT: Apparatus to clean automotive type air filters by washing them to remove dust accumulations and for drying them for reuse. The unit provides a filter receiving rotatable platform disposed in a liquid retaining receptacle. A water or cleaner level adequate to submerge the filter is useable with fluid being introduced through nozzles disposed to impinge against the filter for washing agitation or against impeller vanes on the platform to cause rotation thereof. After washing is completed and the cleaner solution is removed, the fluid rotated platform centrifugally spins and dries the filter. Air selectively introduced through provided fluid nozzles that are directed outwardly through the filter can supplement the centrifugal drying and, additionally or alternately, air impinged on the filter surfaces from the fluid nozzles can be used for further drying.

Patented Nov. 10, 1970
3,538,926
Sheet 1 of 3
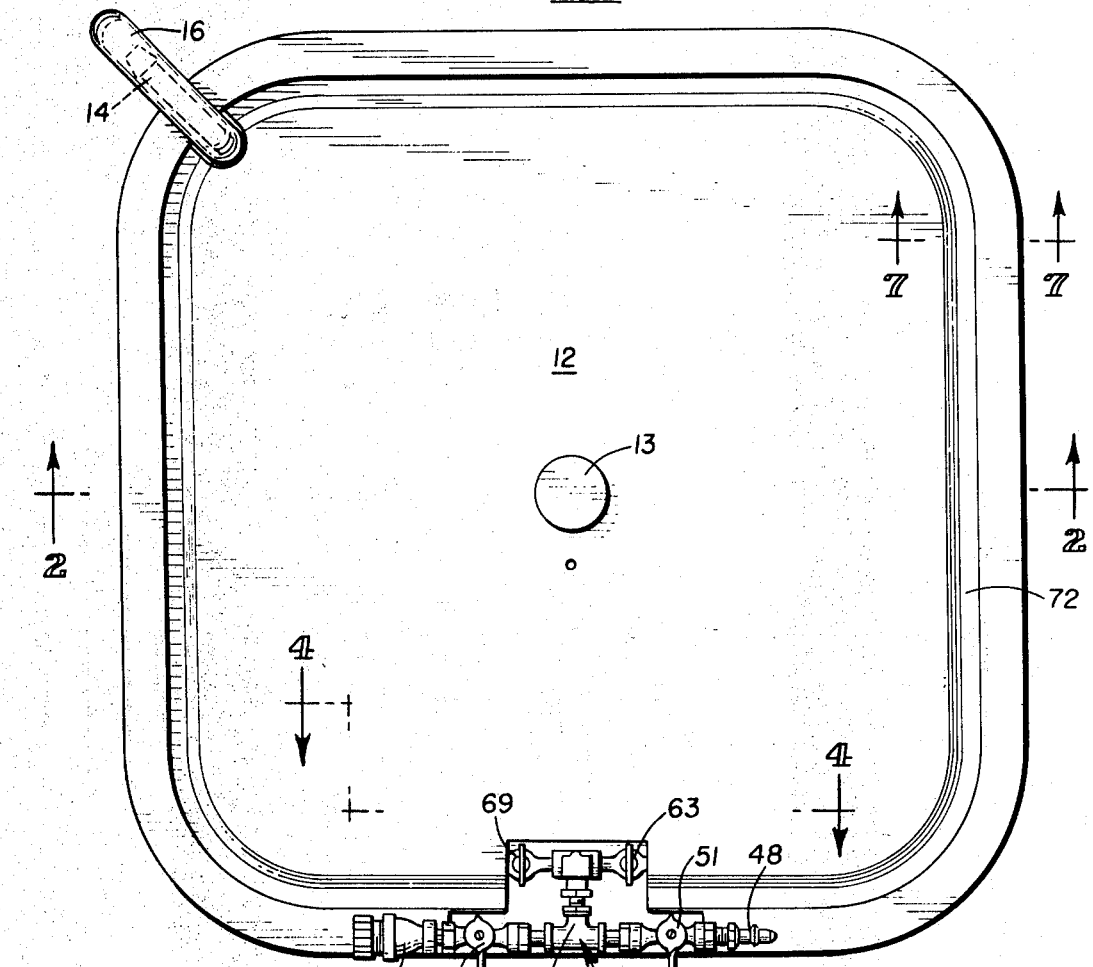
Fig_1
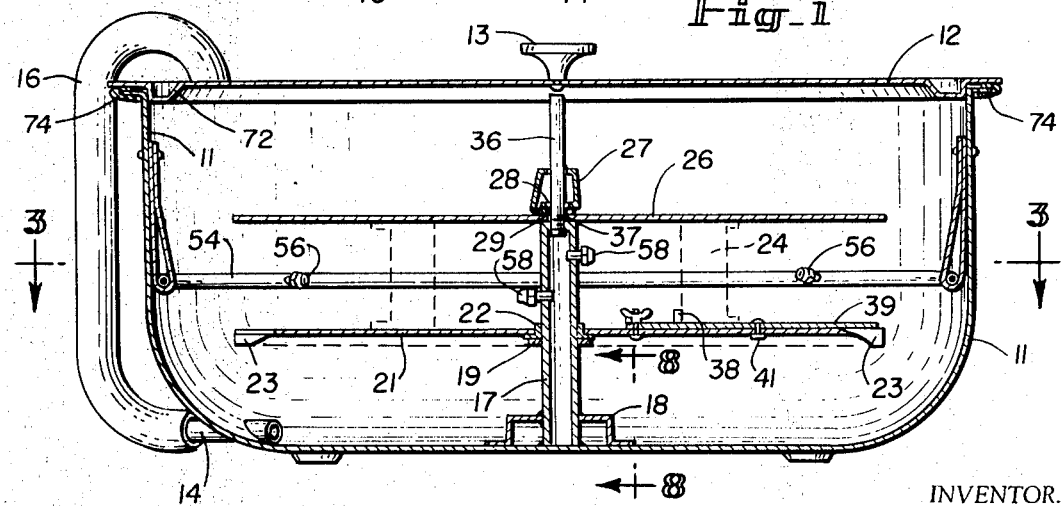
Fig_2
INVENTOR.
GEORGE G. NESBITT
BY
ATTORNEY Patented Nov. 10, 1970
3,538,926
Sheet 2 of 3
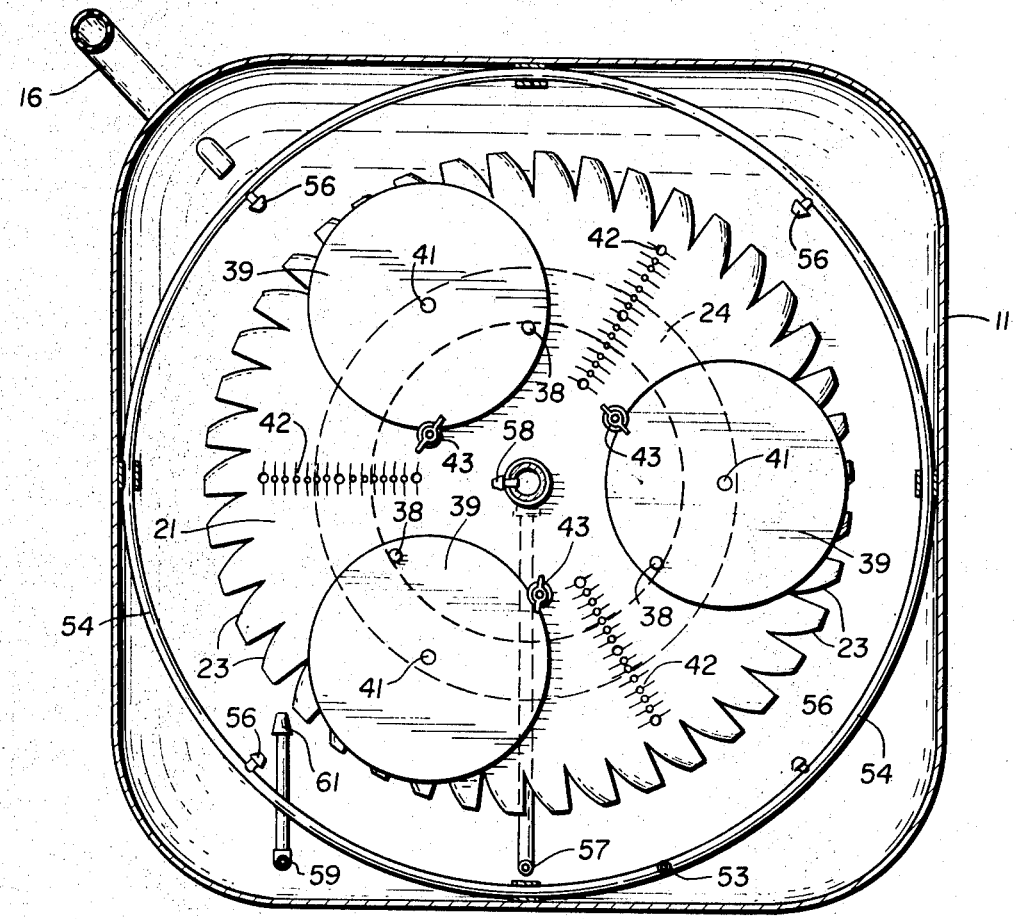
Fig_3
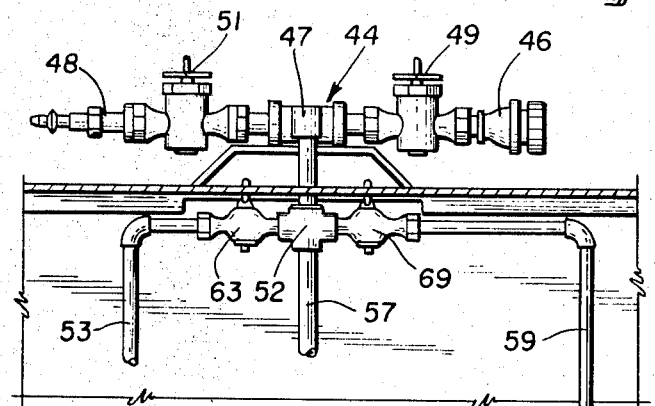
Fig_4
INVENTOR.
GEORGE G. NESBITT
BY
ATTORNEY

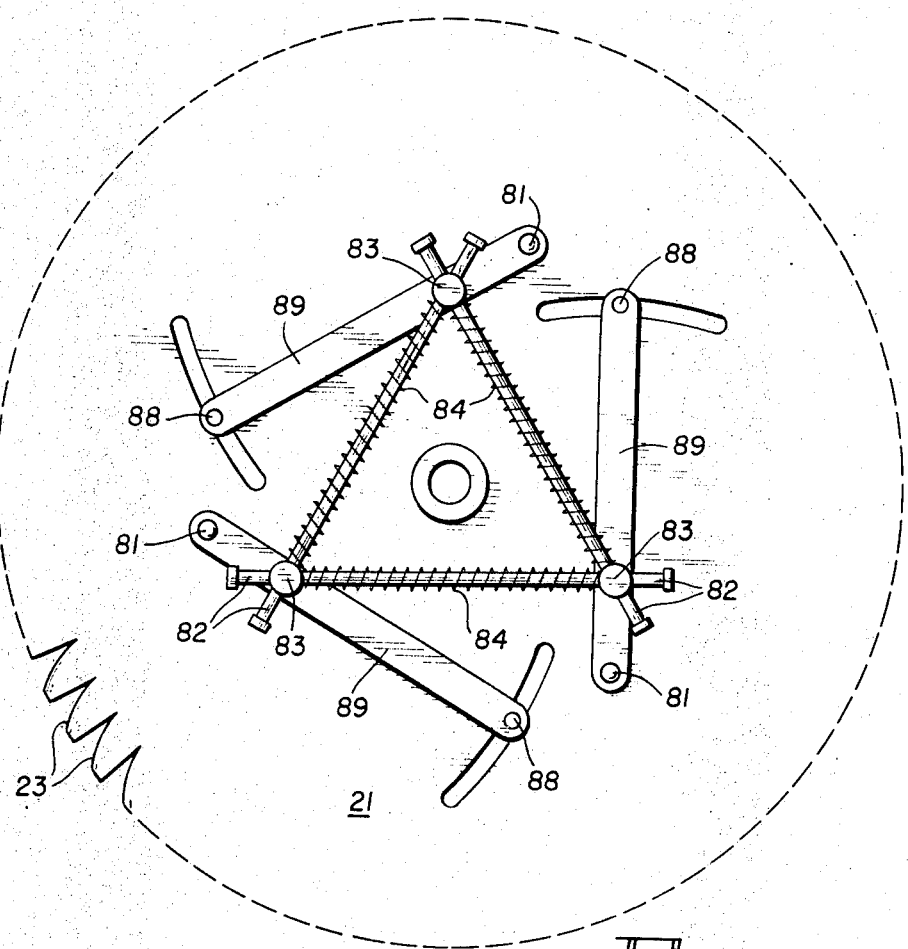
Fig_5
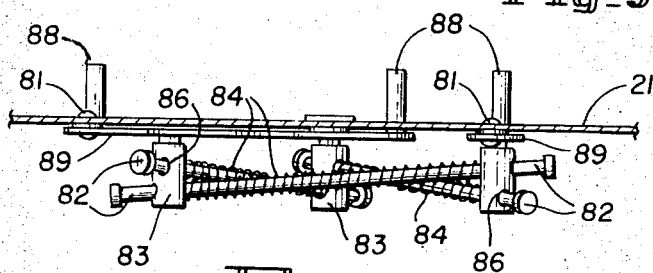
Fig_6
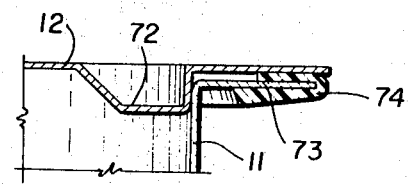
Fig_7
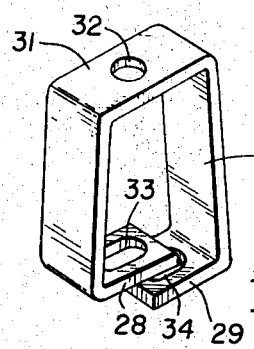
Fig_8
Fig_9
INVENTOR.
GEORGE G. NESBITT
BY
ATTORNEY

WASHER-DRYER FOR AUTOMOTIVE TYPE AIR FILTERS

BACKGROUND OF THE INVENTION

Most present day vehicles have an air cleaner that is mounted on the air intake to intercept and remove dust and dirt from the air being introduced into the engine. In normal driving conditions the filter will after extended usage become clogged with dirt and grime. At present, replaceable cartridge filter units are usually discarded after they become dirty. In order to avoid the expense of periodically replacing the filter cartridges, attempts are often made to clean the filter with a compressed air hose or by use of other mechanical techniques. Such cleaning is generally not satisfactory, since the small dust particles are intimately engaged to the usually convoluted or folded paper filter medium. Since dust accumulations in the filter can cause changes in the incoming air flow patterns to such an extent as to effect the engine efficiency, it is quite desirable that the filter be kept unclogged. Apparatus for regularly cleaning used filter cartridges so that they can be replaced on the engine could present a more economical and operationally efficient solution than the presently recommended periodic replacement of such filter cartridges.

While the filter membrane is made of paper, it has been found that the cartridges can be efficiently cleaned by washing in water or cleaning solvent solutions if proper precautions are taken to avoid damage to the filter membranes. Hand washing techniques can remove up to 80 percent of the accumulated dust particles to substantially improve the flow characteristics of used filter cartridges.

SUMMARY OF THE INVENTION

Studies have indicated that a washer-dryer mechanism can be provided to obtain improved and more efficient filter flow values for serviced filter cartridges. In order to improve operating efficiency and to make the reconditioning of automotive type air filters economically and operationally feasible, the present invention provides an apparatus adapted to receive and hold air filters of varying sizes and shapes within a receptacle so that the air filters may be wetted and soaked by a water and detergent or other cleaning solvent solution to loosen accumulated dirt and dust. Air filter cartridges are disposed on a rotatable platform within a fluid tank, and an incoming flow of cleaning fluid can be directed against impeller vanes on the rotatable platform to induce movement thereof. At the same time additional fluid can be directed against the usually convoluted surfaces of the filter medium by additional fluid nozzles directed at the inner and outer surfaces of the filter. In the present embodiment of the invention, liquid or gaseous fluids can be introduced through the nozzles used. Accordingly, after the initial introduction of cleaning fluid into the tank, the fluid itself can be agitated and redirected against the surfaces of the filter by quantities of gaseous fluid or air supplied through the nozzles.

After an adequate soaking and washing period the cleaner solvent or liquid is removed from the tank, and thereafter air or other fluid may be directed against the impeller vanes of the platform to rotate the platform at high speed and centrifugally spin residual cleaning solvent away from the filter medium. As the filter is rotated, air may be discharged from nozzles disposed within the filter or filter cartridge to supplement or reinforce the resultant centrifugal moisture elimination. Though most of the cleaning liquid is removed from the filter medium by centrifugal or reinforced centrifugal operations, further drying is possible if air is later ejected from additional nozzles to be impinged against inner and outer filter medium surfaces.

In preferred embodiments the rotatable platform will provide a centering device to assure correct and balanced placement of the filter on the platform. An automatic filter centering mechanism which uses a spring, crank arm, and guide combination is disclosed.

An overall object of the invention is to provide an efficient and economical washer-dryer apparatus for cleaning automotive type air filters.

A further object of the invention is to provide means whereby a fluid washing medium may be used additionally to power the washing and agitating operations of the apparatus to obtain efficient dust particle separation and removal.

Another object of the invention is to provide a rotatable filter support platform which may be rotated at slow or fast speeds by the selective and/or controlled introduction of filter washing or drying fluids.

BRIEF DESCRIPTION OF THE DRAWINGS

Further features, advantages and objects of the present invention will become more apparent with reference to the following description and drawings, in which FIG. 1 is a top plan view of an apparatus embodiment with a tank or tub closure cover in place, FIG. 2 is a cross-sectional elevation taken along the line 2–2 of FIG. 1, FIG. 3 is a plan view in cross section taken along the line 3–3 of FIG. 2 and illustrating a first filter element centering device, FIG. 4 is a broken cross-sectional elevation taken along the line 4–4 of FIG. 1 to further illustrate fluid supply and control components, FIG. 5 is a bottom view showing a second filter element centering device embodiment, FIG. 6 is a partial side view of the mechanism of FIG. 5, FIG. 7 is a cross-sectional elevation taken along the line 7–7 of FIG. 1, FIG. 8 is a partial cross section taken along the line of 8–8 of FIG. 2, and FIG. 9 is a perspective view showing a filter retaining clamp.

DESCRIPTION OF THE PREFERRED EMBODIMENTS

The overall configuration for an embodiment of the invention is shown in FIGS. 1 and 2. In such embodiment a tub or open top tank 11 is provided which has a closely fitted cover 12 that may be placed on or removed from the tank by use of the handle 13. The tank has a drain spout 14 to which a drain hose 16 may be attached. When the hose is in an elevated position as illustrated, water, cleaning solvents or other liquids introduced into the tub will be retained. The hose may be lowered to drain the tub after a soaking cycle is completed or to prevent the accumulation and retention of other liquid materials introduced.

A pedestal mount 17 having a base 18 is disposed centrally in the tank 11, and a shoulder 19 on the pedestal provides support for a rotatable platform 21 which has a central bearing surface 22. The platform revolves freely about the upright hollow pedestal 17 and its support shoulder 19. The platform 21, as shown in FIG. 3, is of circular configuration, and a plurality of impeller vanes 23 are provided in equally spaced positions about the periphery of the platform. The platform is adapted to receive and hold cartridge type air filters which may be of different heights or diameters. An air filter cartridge of typical shape but minimum height is represented in dotted outline and identified by the numeral 24. A cover plate 26 may be engaged against the top of a filter cartridge 24 to hold the filter in place. The cover plate is itself retained in desired position by a lock clip 27, which is more fully shown in FIG. 9. The clip, which is made of resilient material, has paired legs 28 and 29 and a U shaped back 31. The back has a central opening 32, and each of the legs 28 and 29 are provided with openings 33 and 34, respectively. In order to place the clip 27 on a standpipe 36 extending above pedestal 17, the resilient clip is compressed inwardly until the openings 33 and 34 are aligned and thereafter the clip is moved downwardly into position on the standpipe 36. When the clip is in position, the compressing force is released and the clip will be held in position on the standpipe. Preferably the clip is positioned on the standpipe to provide rather light engagement between the clip leg 29 and the cover plate 26. With this arrangement the cover plate 26, which has an enlarged central opening 37, can rotate with the platform 21 and the filter cartridge 24 and with respect to the standpipe 36.

In order to assure accurate concentric positioning of filter cartridges 24 with respect to the rotating platform 21, a plurality of adjustable guide pins 38 are provided in the FIGS. 2 and 3 embodiment. These pins 38 are disposed on the upper surfaces of rotatable disks 39 which are secured on the upper face of the platform 21 by pivots 41. When a filter cartridge is being placed on the platform, the pins 38 are rotated inwardly toward the central axis of the platform; thereafter, the filter is positioned on the platform and concentrically aligned with respect to a plurality of radially disposed markers 42 scribed or drilled into the face of the platform 21. When the filter is properly centered, the pins 38 are rotated outwardly to engage the inner wall of the filter cartridge, and locking wing nuts 43 on bolts passing only through the platform 21 are disposed adjacent each disk 39 and are tightened to hold the disks 39 and the associated pins 38 in the desired position. Accurate and secure filter placement is desirable, since the platform 21, the filter cartridge 24 and the cover plate 26 will during a normal washing and drying cycle be rotated at speeds where any eccentricity of placement would cause undesirable vibrations.

In order to obtain the desired washing action and further to provide for centrifugal and air drying of washed filter cartridges, a plurality of discharge nozzles are provided within the tank structure 11. Various discharge nozzles are positioned for special purposes and are interconnected to a main flow manifold 44 for the regulated introduction of fluids as desired. The interconnecting pattern for a preferred embodiment in which water and air fluids are used is shown in FIGS. 1—4. First, the main manifold provides for the interconnection of water and air supplies and for the conjoint or separate introduction of such fluids during different washing and drying cycles. A water connector 46 is disposed at one side of a Tee 47, and an air connector 48 is disposed at the opposite side thereof. A water control valve 49 and an air control valve 51 are provided so that water and air may be separately or conjointly introduced to the system as desired. The interconnecting Tee 47 is connected to a cross 52 disposed within the tank 11. Cross 52 is connected into three outlet lines as shown in FIG. 4. The first outlet line 53 is connected to a ring hoop 54 which is disposed about the tank 11 to supply a plurality of nozzle outlets 56 which are directed inwardly toward any platform supported filter cartridge so that fluids emitted from the nozzles 56 will be impinged against the exterior surfaces of the filter cartridge and the filter medium used therein. The nozzles 56 may be disposed at different angles with respect to the horizontal so that all the exterior surfaces of the filter will be subjected to direct fluid impingement as the filter is rotated.

A central outlet line 57 from cross 52 is connected directly to the center of pedestal 17 and provides a fluid supply for nozzles 58 which are disposed within the filter cartridge and at different elevations to assure direct impingement of fluid against the inner filter membrane surfaces of the filter cartridge 24. The third outlet line 59 is connected to an impeller nozzle 61 which is positioned and directed against the vanes 23 of the platform 21. Fluid emitted through this circuit and directed against such vanes will power the rotary movement of the platform 21. Outlet circuits 53 and 59 are controlled by separate valves 63 and 69, respectively, which may be used to cut off or regulate the fluid flow in such circuits.

In a typical filter cartridge cleaning cycle, water, cleaning solution or other liquid will be introduced through the connector 46 and valve 49 and through the outlets 53, 57, 59 and their associated nozzles 56, 58 and 61 until a liquid level has been established in the tank to completely cover and surround the filter cartridge 24. Plain water or water containing a soap or detergent or a cleaning solvent introduced through the directed flow nozzles 56 and 58 will cause an initial wetting and washing of the filter membrane surfaces. If the valve 69 is open at the time of such initial cleaning fluid introduction, a slow rotation of the platform 21 will result, and all of the filter surfaces will be contacted. If all circuits are used, the tank can be filled quickly. If detergent or soap powders are to be used in water to provide the cleaning solution, they may be deposited on the platform 21, where they will be contacted by the flow from the spray nozzles to assure complete dissolution and dispersal.

Once the tank has been filled, it is often advantageous to let the cleaning solution soak into the filter membrane in order to substantially loosen the accumulated dust and dirt. During such soaking cycle minor agitation can be beneficial. Air or and air/water combination can be introduced through all of the nozzles to stir the cleaning fluid and redirect it against and past the filter membrane surfaces. Flow can be maintained through the outlet circuit 59 and nozzle 61 to cause a desirable slow rotation of the platform 21. After the filter has been sufficiently wetted and washed in this initial wet cycle, a valve (not shown) may be opened or the hose 16 may be lowered to discharge the cleaning fluid from the tank. Simultaneously with the draining of the cleaning fluid a rinse cycle may be instituted by the introduction of water or air and water through the nozzle circuits. Since the valve 63 may be closed or only partially opened, the flow through the ring 54 and the nozzles 56 may at this time be cut off or reduced. At the same time flow through the central outlet 57 and nozzles 58 can be increased so that the predominant rinse operations are directed toward and through the filter medium in a reverse direction with reference to the initial air flow direction through an in-use filter cartridge. This reverse flushing of the filter is beneficial in removing accumulated dirt particles so that a highly efficient cleaning may be obtained.

After an initial reverse fluid flush and after the level of liquid in the tank has been lowered to a point below the platform 21, the valves 63 and 49 may be completely closed. With the water supply shut off all air flow can be through the central nozzles 58 and through the impeller nozzle 61. Air under pressure of 60 to 90 pounds introduced under such condition will cause rapid rotation of the platform 21 so that liquid still retained in the filter will be centrifugally forced in reverse direction back through the filter and away therefrom to be impinged against the walls of the tank 11.

This centrifugal spinning of the air filter cartridge can itself substantially dry the filter medium, but it has been found that the ejection of supplementary air simultaneously through the central nozzles 58 will beneficially increase such drying action. The reverse air flow established by the nozzles 58 and the combined centrifugal action will substantially dry the filter in a short period of time. After an initial drying cycle using centrifugal action and the central nozzles 58, the valve 63 may be reopened so that both the interior and exterior surfaces of the filter medium will be exposed to a directed air blast for further drying.

With proper regulation of fluid flows a filter which has been washed can be adequately dried for reuse in a period of less than two minutes where a centrifugal spin and supplementary directed air cycle is used. After such short cycle the moisture still retained would not be detrimental to an engine or to its operation. The residual moisture could temporarily improve the engine functions.

Since high rotative speeds can be obtained and since an air, water and detergent combination can be used, it is desirable that the top cover 12 be closely fitted with respect to the tank 11. FIG. 7 shows the use of a draw formed cover having a shoulder 72 for mating engagement with the lip 73 of the tank 11. A formed rubber gasket 74 can also be provided to obtain a liquid-tight seal between cover and tank.

A second embodiment incorporating automatic means for centering the filter cartridge is shown in FIGS. 5 and 6. In the bottom view of FIG. 5 the pins 88 which engage the interior surface of the filter cartridge 24 are positioned to extend upwardly through the platform 21 and to move in an arcuate path about their pivots 81. In order that all of the pins 88 will move outwardly to positions defining concentric circles, the arms 89 upon which the pins 88 are mounted are interlocked each to each by a system of slide bars 82 and guides 83. The guides 83 are pivotally mounted on each of the arms 89 at a point close to the pivots 81. The guides 83 have two holes 86 drilled diametrically therethrough at positions that are 60° out of alignment each to each. The guide bars 82 are then selectively positioned through such openings with springs 84 being disposed on the guide bars 82 and between the guides 83 whereby the springs urge the guides 83 and, accordingly, the arms 89 to expanded position. As the arms expand outwardly the distance between adjacent guides 83 is increased and, accordingly, the bars 82 slide reciprocally in the angularly positioned openings 86. Such movement is accompanied by a minor rotation of the guides 83 with respect to the arms 89 as the bars 82 are maintained in their equilateral triangular positioning. This constant angular positioning of the bars assures equal movement patterns for the arms 89 and keeps the pins 88 in positions concentric with the center of the platform 21.

When a filter is to be applied to this embodiment of the invention, the operator engages the pins to compress and move them toward the center as the filter cartridge is placed on the platform 21. Thereafter, on release of the pins 88, the pins 88 will move to hold the filter cartridge in concentric position. While a plurality of springs 84 are illustrated, a single spring on a single guide bar would give a satisfactory result.

In all embodiments of the invention the washing and drying cycles will utilize components for rotating a filter medium past spray nozzles that are disposed to impinge cleaning fluid against the exposed surfaces of the filter medium. The embodiments will further include means for rotating the filter cartridges to centrifugally eliminate accumulated or supplied liquid from the filter medium in such manner that the direction of flow is countercurrent to the original air flow direction through an in-use filter cartridge. This centrifugal drying can be supplemented by the introduction of air or gaseous fluid that is directed toward the inner surfaces of the filter medium for countercurrent escape therethrough in a manner that will directly supplement the centrifugal spin drying.

When the combined washing and drying cycles are used in the described order, the apparatus is capable of removing 95-—98 percent or better of the dust materials that have been accumulated by a filter. When air filters cleaned by this process are again installed, the initial flow patterns are re-established, and the fuel/air ratio for the carburetor is returned substantially to its as initially adjusted value. The service life for purchased air filter cartridges can be substantially increased at a comparatively low cost, and the described cleaning and servicing operations can reduce the overall expense of air-intake system maintenance.

While use of a cleaning liquid and a wet or soaking cycle has been described, it should be noted that the apparatus can be used with only a gaseous fluid being utilized. The gaseous fluid could include cleaning solvent components to substantially loosen and remove accumulated dirt. For intermediate tuneup or servicing operations less than the described full filter medium cleaning operations may be satisfactory. Compressed air alone introduced through the central spray nozzles 58 as the platform is rotated by the impeller nozzle 61 can countercurrently displace a substantial portion of accumulated dust particles.

I claim:

1. Washer-dryer apparatus for air filters having a pervious filter medium disposed to provide a central opening comprising an enclosure for selectively retaining fluid materials, a rotatably mounted platform in said enclosure for receiving and holding said air filters, fluid introduction means for said apparatus inclusive of at least one flow outlet directed outwardly and disposed in the central opening of an air filter positioned on said platform, a flow outlet directed inwardly and positioned exteriorly of said air filter, and a flow outlet positioned adjacent said platform, whereby fluids may be selectively impinged against inside and outside surfaces of said air filter and against said platform whereby the platform is rotated by the energy of fluid impinged thereagainst, control means for selectively and/or conjointly introducing a liquid washing fluid and a gaseous drying fluid into said enclosure through said fluid introduction means, an air filter centering mechanism on said platform inclusive of a plurality of movable supports disposed above said platform for engagement with said filters, and means for holding said supports in air filter contacting position at equal radial distances from the center of rotation for said platform.

2. Structure as set forth in claim 1 and further inclusive of linkage elements interconnecting said movable supports and operative to maintain the supports at equal distances from the center of rotation for said platform, and a spring element for urging said supports toward air filter contacting positions.

3. Structure as set forth in claim 1 and further comprising valve means for selectively cutting off fluid flow through said exterior flow outlet whereby the total flow against and through said filter is in concurrent direction supplementing fluid movement patterns due to rotation of said platform and filter.

4. Structure as set forth in claim 3 and further inclusive of linkage elements interconnecting said movable supports and operative to maintain the supports at equal distances from the center of rotation for said platform, and a spring element for urging said supports toward air filter contacting positions.